US012799018B2

(12) United States Patent
Cao et al.

(10) Patent No.: US 12,799,018 B2
(45) Date of Patent: Nov. 17, 2026

(54) GLASS MATERIAL WITH HIGH REFRACTIVE INDEX AND RADIATION RESISTANCE, THE METHOD FOR PREPARING THE SAME, AND APPLICATIONS THEREOF

(71) Applicant: CNBM PHOTONICS TECHNOLOGY CO., LTD., Zaozhuang (CN)

(72) Inventors: Zhenbo Cao, Zaozhuang (CN); Jinsheng Jia, Zaozhuang (CN); Yang Zhang, Zaozhuang (CN); Shengyun Yang, Zaozhuang (CN); Jingming Zheng, Zaozhuang (CN); You Zhou, Zaozhuang (CN); Meilun Zhang, Zaozhuang (CN); Zijin Li, Zaozhuang (CN); Haifeng Lv, Zaozhuang (CN); Xueliang Lv, Zaozhuang (CN)

(73) Assignee: CNBM PHOTONICS TECHNOLOGY CO., LTD., Shandong (CN)

( * ) Notice: Subject to any disclaimer, the term of this patent is extended or adjusted under 35 U.S.C. 154(b) by 217 days.

(21) Appl. No.: 18/293,005

(22) PCT Filed: Mar. 16, 2023

(86) PCT No.: PCT/CN2023/081958

§ 371 (c)(1),
(2) Date: Jun. 25, 2025

(87) PCT Pub. No.: WO2024/178753

PCT Pub. Date: Sep. 6, 2024

(65) Prior Publication Data

US 2025/0382220 A1 Dec. 18, 2025

(30) Foreign Application Priority Data

Feb. 27, 2023 (CN) ......................... 202310200621.3

(51) Int. Cl.

| | |
|---|---|
| ***C03C 3/07*** | (2006.01) |
| ***C03B 5/187*** | (2006.01) |
| ***C03B 5/225*** | (2006.01) |
| ***C03B 25/02*** | (2006.01) |
| ***C03C 3/105*** | (2006.01) |
| ***C03C 13/04*** | (2006.01) |
| *G02B 6/10* | (2006.01) |

(52) U.S. Cl.

CPC ................ *C03C 3/07* (2013.01); *C03C 3/105* (2013.01); *C03C 13/045* (2013.01); *C03B 25/02* (2013.01); *G02B 6/10* (2013.01)

(58) Field of Classification Search

CPC ......... C03C 3/07; C03C 3/105; C03C 13/045; C03C 13/046; C03B 25/02; C03B 5/187; C03B 5/225; C03B 25/00; G02B 6/10; G02B 1/00

See application file for complete search history.

(56) References Cited

U.S. PATENT DOCUMENTS

| | | | | |
|---|---|---|---|---|
| 4,029,897 A * | 6/1977 | Mayer | C03C 8/245 501/15 |
| 4,277,286 A | 7/1981 | Boyd et al. | |
| 4,520,115 A * | 5/1985 | Speit | C03C 3/07 501/78 |
| 5,057,464 A | 10/1991 | Miwa et al. | |
| 5,548,353 A * | 8/1996 | Kassner | C03C 3/07 351/159.48 |

(Continued)

FOREIGN PATENT DOCUMENTS

| | | | | |
|---|---|---|---|---|
| CN | 1530340 A | | 9/2004 | |
| CN | 1735570 A | | 2/2006 | |
| CN | 101287685 A | | 10/2008 | |
| CN | 113754275 A | | 12/2021 | |
| CN | 116253507 B | * | 12/2023 | C03C 3/07 |
| JP | H09-208255 A | | 8/1997 | |
| JP | 2003-095695 A | | 4/2003 | |

OTHER PUBLICATIONS

Chengyu Wang; "Handbook of Glass Propert and Technology;" 2013; pp. 87-92; Chemical Industrial Press.
Guogan Zhang; "Chemical Industry;" 1998; pp. 241-242; Hunan Normal University Press.
Nov. 21, 2023 Search Report issued in International Patent Application No. PCT/CN2023/081958.
Nov. 21, 2023 Written Opinion of the ISA issued in International Patent Application No. PCT/CN2023/081958.
Aug. 1, 2023 Office Action and Search Report issued in Chinese Patent Application No. 202310200621.3.

(Continued)

*Primary Examiner* — Elizabeth A. Bolden
(74) *Attorney, Agent, or Firm* — Oliff PLC

(57) ABSTRACT

A glass material with high refractive index and radiation resistance, the method for preparing the same, and applications thereof, wherein the glass material, by mass percentage, includes 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of an oxide selected from $Na_2O$, $K_2O$, $Rb_2O$, and $Cs_2O$. The glass material has a refractive index≥1.80, a glass transition temperature≥560 °C, a yield point temperature≥650 °C, and good thermal resistance. Its coefficient of thermal expansion is $(85\text{-}90)\times10^{-7}/°C$, indicating good thermal processability, suitable for forming large-sized devices. After irradiation with a 4700 Gy dose of X-rays, a transmittance reduction is ≤2%, making it suitable for creating radiation-resistant optical components such as optical glass and fiber optic panels.

37 Claims, 2 Drawing Sheets

(56) References Cited

U.S. PATENT DOCUMENTS

| | | | | |
|---|---|---|---|---|
| 2003/0072554 | A1* | 4/2003 | Dohmen | C03C 3/15 385/142 |
| 2011/0034314 | A1 | 2/2011 | Ogino | |

OTHER PUBLICATIONS

Sep. 25, 2023 Office Action issued in Chinese Patent Application No. 202310200621.3.

* cited by examiner

GLASS MATERIAL WITH HIGH REFRACTIVE INDEX AND RADIATION RESISTANCE, THE METHOD FOR PREPARING THE SAME, AND APPLICATIONS THEREOF

The present invention claims priority to a Chinese patent application submitted to the China National Intellectual Property Administration on 27 Feb. 2023, with an application number 202310200621.3, titled "glass material with high refractive index and radiation resistance, the method for preparing the same, and applications thereof". The entire contents of this Chinese patent application are incorporated herein by reference and constitute a part of the present invention.

TECHNICAL FIELD

The present invention belongs to a field of glass technology, and specifically relates to a glass material with high refractive index and radiation resistance, the method for preparing the same, and applications thereof.

BACKGROUND

Any discussion of prior art throughout the specification should not be construed as an admission that such prior art is widely known or forms part of the common general knowledge in the field.

X-ray detectors are mainly used to explore and image the internal structure of the human body and other living organisms or objects and are now widely used in the fields of digital X-ray imaging, pet medical care, security inspections, industrial non-destructive testing and food safety inspection. Fiber optic panel is a key technical component in X-ray radiology industry. Fiber optic panels act as a substrate for scintillators in detector systems while reducing noise, protecting sensors and enhancing contrast. These fiber optic panels allow physicians to view real-time, high-resolution images, reducing the intensity of X-ray exposure to sensors like Charge-Coupled Device (CCD) and Complementary Metal-Oxide-Semiconductor (CMOS).

Currently, the radiation-resistant fiber optic panels used in X-ray detectors, primarily made of glass materials, are heavily reliant on imports. The imported fiber optic panels for X-ray detectors are costly, which is not conducive to the mass promotion and application of the complete equipment. Additionally, domestically developed core glass materials for these fiber optic panels face several issues. For instance, poor X-ray absorption, browning and drastic reduction in short-wavelength transmittance under X-ray irradiation, impairing transmission and catadioptric optical system, posing significant risks to detectors; poor radiation resistance, leading to noticeable transmittance reduction after X-ray exposure; high coefficient of thermal expansion and poor heat processing ability, making the core glass material, having a high expansion coefficient difficulty in finding matching cladding glass, and leading to overall poorer thermal processing performance of the fiber optic panel device; low yield point temperature, typically 600-630 °C, making the material prone to quality issues during high-temperature baking or in high-temperature environments. The refractive index of core glass material is usually less than 1.80, generally between 1.70-1.77. In fiber optics, light can only propagate along the fiber if it enters at a specific cone angle. This angle's half-angle is known as the acceptance angle θ, which solely depends on the refractive indices n of the core and cladding glasses, where $$\sin\theta = \sqrt{n_{core}^2 - n_{cladding}^2},$$

a higher refractive index of the core glass leads to a larger acceptance angle θ, allowing more light into the fiber. The aforementioned points indicate significant shortcomings in domestically produced core glass materials used for radiation-resistant fiber optic panels.

It is an object of the present invention to overcome or ameliorate at least one of the disadvantages of the prior art, or to provide a useful alternative. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

SUMMARY

In response to the shortcomings of existing technology, the present invention provides a type of glass material, radiation-resistant optical components containing the glass material, and the methods for preparing the glass material, and applications thereof. The glass material according to the present invention possesses outstanding properties, selected from excellent X-ray absorption and radiation resistance stability, appropriate coefficient of thermal expansion (CTE) and yield point temperature, good processability and adaptability in manufacturing. The glass material according to the present invention can be used as core glass material for optical glass fibers and fiber optic panels. The fiber optic panels made from the glass material also exhibit superior radiation resistance, fundamentally meeting the requirements for applications in radiative environments. This resolves the core material supply challenges and industrial chain security issues for X-ray detectors.

Specifically, the present invention provides one or more of the following technical solutions as described below.

In a first aspect, the present invention provides a glass material for using as a core glass material, comprises or consists of, in mass percentage, 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

The fundamental composition of the glass material according to the present invention should simultaneously contain specific contents of $SiO_2$, BaO, PbO, and $CeO_2$, which is an important condition for enabling the glass material according to the present invention to have an excellent X-ray absorption effect and radiation resistance stability.

During the research and development process of the present invention, the inventors found that heavy metal oxides, due to their high atomic mass and large radiation absorption cross-section, make the glass containing these metals exhibit strong X-ray absorption. As a heavy metal element with a high atomic number, lead (Pb) has a high mass attenuation coefficient. The presence of lead oxide (PbO) in the glass material according to the present invention allows for the absorption of high-energy radiation, including X-rays. In the glass material, PbO can function both as a network modifier and a network former. In a glass material, Pb primarily exists in a structural form of [$PbO_4$]. Generally, glass is considered as high-lead glass when a content of lead oxide is ≥26%. Higher PbO content can disrupt the SiO network and form non-bridging oxygen. However, a high content of PbO may introduce stability issues.

To address this issue, the present invention uses silicon dioxide ($SiO_2$) as a basic framework of the glass structure. While reducing the PbO content, barium oxide (BaO) and cerium oxide ($CeO_2$) are introduced. Barium (Ba), being the heaviest metal element in the alkaline earth metals with the largest X-ray absorption cross-section, can strongly absorb X-rays and γ-rays. In the present invention, the introduction of Ba allows for significant replacement of lead while maintaining a high equivalent lead level (≥0.3 mmpb), reducing the content of lead used and significantly increasing the softening temperature of the glass material. The Cerium (Ce) atom has a unique electronic configuration, $4f^1 5d^1 6s^2$, with two valence states $Ce^{3+}$ and $Ce^{4+}$. In a glass structure, there is an electronic valence equilibrium of $Ce^{3+} \rightleftharpoons Ce^{4+} + e^-$. $Ce^{3+}$ tends to capture holes and oxidize to $Ce^{3+(+)}$, while $Ce^{4+}$ tends to capture free electrons and reduce to $Ce^{4+(-)}$, preventing free electrons produced by irradiation from entering defects in the glass structure and thus inhibiting color center formation. In the present invention, $CeO_2$ is introduced as a stabilizer to enhance the radiation resistance of the glass material. However, the inventors found that although $CeO_2$ improves radiation stability, excessive $CeO_2$ can reduce the transmittance of the glass material, particularly in the near-ultraviolet spectrum.

To address this, the inventors further adjusted contents of $SiO_2$, BaO, PbO, and $CeO_2$. Specifically, by mass percentage, a content of $SiO_2$ is 25-40%, and in some embodiments of the present invention, the content of $SiO_2$ may be 25-40%, 27-40%, 27.5-40%, 30-40%, 20-36%, or 20-35%, etc. By mass percentage, a content of PbO is 40-50%, and in some embodiments of the present invention, the content of PbO may be 40-48%, 43-50%, 44-50%, 44-48%, 45-50%, or 45-48% etc. By mass percentage, a content of BaO is 5-20%, and in some embodiments of the present invention, the content of BaO may be 5-18%, 5-18.1%, 5-15%, 6-20%, 6-15%, or 5-8%, etc. By mass percentage, a content of $CeO_2$ of 1-5%, and in some embodiments of the present invention, the content of $CeO_2$ may be 1.5-5%, 1.7-5%, 2-5%, 1.5-3%, 1.7-3%, or 2-3%, etc.

Based on this, the present invention further utilizes other oxides in appropriate proportions. This ensures that the glass material of the present invention not only possesses excellent X-ray absorption capability and radiation resistance but also suitable coefficient of thermal expansions and yield point temperatures. These properties enable good process compatibility during processes of wire drawing and hot-pressing moulding. Specifically, the combination and content of components are as follows.

In the present invention, aluminum oxide ($Al_2O_3$) serves as a network intermediate in forming the glass structure. Its content affects the coefficient of thermal expansion and the chemical and thermal stability of the glass material. By mass percentage, the content of $Al_2O_3$ is 0-10%; in some embodiments of the present invention, the content of $Al_2O_3$ may be 0, 2-10%, 2-8%, 2-7%, 2-6%, or 2-5%, etc. In the present invention, the use of $Al_2O_3$ enhances the machinability of the glass material, but an excessive content can shorten "viscosity property of glass" of the glass material. In a preferred embodiment of the present invention, the content of $Al_2O_3$ is 2-10%, with a further preference for 2-8%.

In the present invention, the term "viscosity property of glass" refers to a physical property of glass in its high-temperature molten state, distinguished as either "long" or "short". This property requires precise measurement using instruments, such as a rheometer, to assess a viscosity in the viscoelastic state of a sample and calculate a rate of viscosity change. If the viscosity of a sample changes more rapidly, the "viscosity property of glass" is considered "short", indicating a quicker transition in viscosity. Conversely, if the rate of viscosity change is slower, the "viscosity property of glass" is considered "long", indicating a slower transition in viscosity.

In embodiments of the present invention, by mass percentage, a content of calcium oxide (CaO) is 0-5%; further, in some embodiments, the content of CaO may be 0, 1-5%, 1-4%, 4-5%, or 1-3%, etc. In the present invention, CaO, as a network outsider oxide in glass, is introduced to reduce the mid-temperature viscosity of the glass, enhancing mechanical processing, and extending the "viscosity property of glass". In a preferred embodiment of the present invention, by mass percentage, the content of CaO is 1-5%, with a further preference for 1-4%.

In embodiments of the present invention, by mass percentage, a content of lanthanum oxide ($La_2O_3$) is 0-5%; further, in some embodiments, the content of $La_2O_3$ may be 0, 0.5-5%, 0.5-3%, 0.5-2%, 1-5%, 1.7-5%, 2-5%, 1-2%, 1.7-2%, 1-3%, 1.7-3%, 0-1.7%, or 1-1.7%, etc.

In embodiments of the present invention, by mass percentage, a content of niobium pentoxide ($Nb_2O_5$) is 0-2%; further, in some embodiments, the content of $Nb_2O_5$ may be 0, 0.5-2%, 1-2%, or 1.5-2%, etc.

In embodiments of the present invention, by mass percentage, a content of tantalum pentoxide ($Ta_2O_5$) is 0-2%; further, in some embodiments, the content of $Ta_2O_5$ may be 0, 0-1.5%, 1.5-2%, 0-1.5%, or 1-2%, etc.

In embodiments of the present invention, by mass percentage, a content of bismuth oxide ($Bi_2O_3$) is 0-1%; further, in some embodiments, the content of $Bi_2O_3$ may be 0, 0.3-1%, 0.5-1%, 0.8-1%, 0.3-0.5%, or 0.3-0.8%, etc.

In the present invention, $La_2O_3$, $Nb_2O_5$, $Ta_2O_5$, and $Bi_2O_3$ are oxides that regulate the structure of the glass. Adding these in appropriate amounts can increase the yield point temperature, improve "viscosity property of glass", and enhance the refractive index of the glass material. However, excessive addition can significantly increase the melting costs and lead to glass crystallization. In some embodiments of the present invention, by mass percentage, a total content of $La_2O_3$, $Nb_2O_5$, $Ta_2O_5$, and $Bi_2O_3$ is not less than 1% and not more than 10%. Additionally, in some embodiments, the total content does not exceed 10%. In a preferred embodiment of the present invention, by mass percentage, the total content of $La_2O_3$, $Nb_2O_5$, $Ta_2O_5$, and $Bi_2O_3$ should range between 1-10%, which may include or exclude the endpoint values.

In the embodiments of the present invention, by mass percentage, a total content of sodium oxide ($Na_2O$), potassium oxide ($K_2O$), rubidium oxide ($Rb_2O$), and cesium oxide ($Cs_2O$) is 0-1%. This means that one or more of $Na_2O$, $K_2O$, $Rb_2O$, and $Cs_2O$ may be added in the embodiments of the present invention, or none of them may be added at all.

In the present invention, $Na_2O$, $K_2O$, $Rb_2O$, and $Cs_2O$ are network modifier oxides in glass. Alkali metal ions within the glass are easily mobile and diffusive. Their appropriate use can reduce the viscosity of glass at high melting temperatures, facilitating easier melting and acting as effective fluxing agents. They also increase the coefficient of thermal expansion of the glass material. However, their introduction should be limited, as excessive amounts can decrease the chemical stability and mechanical strength of the glass material. In some embodiments of the present invention, the glass material comprises one or more of $Na_2O$, $K_2O$, $Rb_2O$, and $Cs_2O$. Preferably, in these embodiments, the total content of $Na_2O$, $K_2O$, $Rb_2O$, and $Cs_2O$ is 0.8-1% by mass percentage. Additionally, in some embodiments of the present invention, a content of $Na_2O$ constitutes 0-50% of the total content of alkali metal oxide selected from $Na_2O$, $K_2O$, $Rb_2O$, and $Cs_2O$. Further, in some embodiments of the present invention, by mass percentage, the content of $Na_2O$ is 0 or the content of $Na_2O$ constitutes 20-50% of the content of alkali metal oxide selected from $Na_2O$, $K_2O$, $Rb_2O$, and $Cs_2O$.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide selected from $Na_2O$, $K_2O$, $Rb_2O$, and $Cs_2O$. In the present invention, when the composition of the glass material is expressed as "consists of the following components by mass percentage" or "composed of the following components by mass percentage", or in a manner with the same meaning, the sum of the mass percentages of the listed components equals 100%.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% CaO, 5-20%

$BaO$, 40-50% $PbO$, 1-5% $CeO_2$, 0-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% $CaO$, 5-20% $BaO$, 40-50% $PbO$, 1-5% $CeO_2$, 0-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% $CaO$, 5-20% $BaO$, 40-50% $PbO$, 1-5% $CeO_2$, 0-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% $CaO$, 5-20% $BaO$, 40-50% $PbO$, 1-5% $CeO_2$, 0-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0.5-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0.5-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0.5-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0.5-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0.5-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0.5-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0.5-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% $CaO$, 5-20% $BaO$, 40-50% $PbO$, 1-5% $CeO_2$, 0-5% $La_2O_3$, 0-2% $Nb_2O_5$, 0-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% $CaO$, 5-20% $BaO$, 40-50% $PbO$, 1-5% $CeO_2$, 0.5-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% $CaO$, 5-20% $BaO$, 40-50% $PbO$, 1-5% $CeO_2$, 0-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% $CaO$, 5-20% $BaO$, 40-50% $PbO$, 1-5% $CeO_2$, 0-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% $CaO$, 5-20% $BaO$, 40-50% $PbO$, 1-5% $CeO_2$, 0-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0.5-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0.5-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0.5-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0.5-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0.5-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 1-5% CaO, 5-20% BaO, 40-50% PbO, 1-5% $CeO_2$, 0.5-5% $La_2O_3$, 0.5-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0.5-5% $La_2O_3$, 0-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0.5-5% $La_2O_3$, 0-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0.5-5% $La_2O_3$, 0-2% $Nb_2O_5$, 0-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0.5-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0.5-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0.5-2% $Nb_2O_5$, 0-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 1-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0.5-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 0-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 1-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 0-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 1-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 1-2% $Ta_2O_5$, 0.3-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 1-2% $Ta_2O_5$, 0-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0-5% $La_2O_3$, 0.5-2% $Nb_2O_5$, 1-2% $Ta_2O_5$, 0.3-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 15-2% $Ta_2O_5$, 0.5-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

In some embodiments of the present invention, the glass material consists of the following components by mass percentage: 20-40% $SiO_2$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, and 0-1% $Bi_2O_3$.

In some embodiments of the present invention, the glass material consists of the following components by mass percentage: 20-40% $SiO_2$, 2-10% $Al_2O_3$, 1-5% CaO, 3-8% BaO, 40-50% PbO, 1-3% $CeO_2$, 0.5-2% $La_2O_3$ and 0.3-1% $Bi_2O_3$.

In some embodiments of the present invention, the glass material consists of the following components by mass percentage: 27.5-40% $SiO_2$, 2-10% $Al_2O_3$, 1-5% CaO, 5-20% BaO, 40-50% PbO, 2-3% $CeO_2$, 0.5-5% $La_2O_3$, 0-2% $Nb_2O_5$, 0-1.5% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

In one or more of the aforementioned embodiments of the present invention, by mass percentage, the content of $SiO_2$ is 25-40%, preferably 27.5-40%. In one or more of the aforementioned embodiments of the present invention, by mass percentage, the content of PbO is 43-50%, preferably 44-50%. In one or more of the aforementioned embodiments of the present invention, by mass percentage, the content of BaO is 5-15%, preferably 5-10%. In one or more of the aforementioned embodiments of the present invention, by mass percentage, the content of $CeO_2$ is 1.7-5%, preferably 2-5%. In one or more of the aforementioned embodiments of the present invention, by mass percentage, the content of $Al_2O_3$ is 0 or 2-10%, preferably 2-8%. In one or more of the aforementioned embodiments of the present invention, by mass percentage, the content of CaO is 0 or 1-5%, preferably 1-4% or 4-5%.

In one or more of the aforementioned embodiments of the present invention, by mass percentage, the content of $La_2O_3$ is 0-1.7% or 0.5-5%, preferably 0, 0.5-2% or 2-5%. In one or more of the aforementioned embodiments of the present invention, by mass percentage, the content of $Nb_2O_5$ is 0.5-2% or 0. In one or more of the aforementioned embodiments of the present invention, by mass percentage, the content of $Ta_2O_5$ is 1.5-2% or 0-1.5%, preferably 1-1.5% or 0. In one or more of the aforementioned embodiments of the present invention, by mass percentage, the content of $Bi_2O_3$ is 0.5-1% or 0.

In one or more of the aforementioned embodiments of the present invention, by mass percentage, the total content of $La_2O_3$, $Nb_2O_5$, $Ta_2O_5$, and $Bi_2O_3$ is not less than 1%. In one or more of the aforementioned embodiments of the present invention, by mass percentage, the total content of $La_2O_3$, $Nb_2O_5$, $Ta_2O_5$, and $Bi_2O_3$ is no more than 10%, preferably no more than 8%.

In one or more of the aforementioned embodiments of the present invention, by mass percentage, the total content of $La_2O_3$, $Nb_2O_5$, $Ta_2O_5$, and $Bi_2O_3$ is 0-10%, preferably 1-10%, further preferably 1-8%.

In one or more of the aforementioned embodiments of the present invention, by mass percentage, the content of alkali metal oxide is 0 or 0.8-1%.

In one or more of the aforementioned embodiments of the present invention, by mass percentage, the content of $Na_2O$ constitutes 0-50% of the content of alkali metal oxide (selected from $Na_2O$, $K_2O$, $Rb_2O$ and $Cs_2O$). In one or more of the aforementioned embodiments of the present invention, by mass percentage, the content of $Na_2O$ is 0, or the content of $Na_2O$ constitutes 20-50% of the content of alkali metal oxide (selected $Na_2O$, $K_2O$, $Rb_2O$ and $Cs_2O$).

In some embodiments of the present invention, the glass material has a refractive index of ≥1.8, leading to a larger acceptance angle θ and allowing more light into the fiber, thus exhibiting good refractive properties.

In some embodiments of the present invention, the glass transition temperature (Tg) of the glass material is ≥560 °C.

In some embodiments of the present invention, the glass material has a yield point temperature of ≥650 °C, showing excellent heat resistance.

In some embodiments of the present invention, the glass material has a coefficient of thermal expansion of (85-90)× $10^{-7}$/°C/°C in the temperature range of 30 °C to 300 °C, which provides good processability.

In some embodiments of the present invention, the glass material maintains high transmittance, with a transmittance at 560 nm of over 80%. Even after irradiation with a 4700 Gy dose of X-rays, the transmittance at 560 nm remains above 78.5%, with a reduction of ≤2%, demonstrating excellent radiation resistance stability. In some embodiments of the present invention, the reduction in transmittance at 560 nm after 4700 Gy dose of X-ray irradiation is ≤1.65%. In more optimal embodiments of the present invention, the reduction is ≤1.5%, or even ≤1.5%, ≤1.3%, or ≤1.2%, showcasing exceptional radiation resistance stability.

In some embodiments of the present invention, the glass material combines these superior properties, with a refractive index of ≥1.8, glass transition temperature of ≥560 °C, a coefficient of thermal expansion of (85~90)×$10^{-7}$/°C, and a reduction in transmittance of ≤2%, or even ≤1.5%, ≤1.3%, or ≤1.2% after 4700 Gy dose of X-ray irradiation, making it particularly suitable for the preparation of optical components or instruments.

For example, in some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0.5-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0.

For example, in some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0.5-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0; wherein, by mass percentage, a total content of $La_2O_3$, $Nb_2O_5$, $Ta_2O_5$ and $Bi_2O_3$ is 1-10%, and a content of $Na_2O$ constitutes 0-50% of the content of alkali metal oxide (selected from $Na_2O$, $K_2O$, $Rb_2O$ and $Cs_2O$).

For example, in some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 1.5-2% $Ta_2O_5$, 0.5-1% $Bi_2O_3$, and a content of 0.8-1% of alkali metal oxide, wherein the alkali metal oxide is selected from at least one of $Na_2O$, $K_2O$, $Rb_2O$ and $Cs_2O$.

For example, in some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0.5-2% $Nb_2O_5$, 1.5-2% $Ta_2O_5$, 0.5-1% $Bi_2O_3$, and a content of 0.8-1% of alkali metal oxide, wherein the alkali metal oxide is selected from at least one of $Na_2O$, $K_2O$, $Rb_2O$ and $Cs_2O$; wherein, by mass percentage, a content of $Na_2O$ constitutes 0-50% of the content of alkali metal oxide (selected $Na_2O$, $K_2O$, $Rb_2O$ and $Cs_2O$).

For example, in some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a total content of $La_2O_3$, $Nb_2O_5$, $Ta_2O_5$ and $Bi_2O_3$ is 1-8%.

For example, in some embodiments of the present invention, the glass material consists of the following components by mass percentage: 20-40% $SiO_2$, 2-10% $Al_2O_3$, 1-5% CaO, 5-10% BaO, 40-50% PbO, 1-3% $CeO_2$, 0.5-2% $La_2O_3$ and 0.5-1% $Bi_2O_3$.

For example, in some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, wherein a total content of $La_2O_3$, $Nb_2O_5$, $Ta_2O_5$ and $Bi_2O_3$ is 1-8%, and a content of 0-1% of alkali metal oxide, wherein the alkali metal oxide is selected from at least one of $Na_2O$, $K_2O$, $Rb_2O$ and $Cs_2O$.

For example, in some embodiments of the present invention, the glass material consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O_5$, 0-2% $Ta_2O_5$, 0-1% $Bi_2O_3$, and content of 0-1% of alkali metal oxide selected from $Na_2O$, $K_2O$, $Rb_2O$ and $Cs_2O$.

For example, in some embodiments of the present invention, the glass material consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, wherein a total content of $La_2O_3$, $Nb_2O_5$, $Ta_2O_5$ and $Bi_2O_3$ is 1-8%, and a content of 0-1% of alkali metal oxide selected from $Na_2O$, $K_2O$, $Rb_2O$ and $Cs_2O$.

For example, in some embodiments of the present invention, the glass material consists of the following components by mass percentage: 27.5-40% $SiO_2$, 2-8% $Al_2O_3$, 1-5% CaO, 5-10% BaO, 44-50% PbO, 1-5% $CeO_2$ (preferably 2-3%), 0.5-5% $La_2O_3$ (preferably 0.5-2% or 2-5%), 0-2% $Nb_2O_5$ (preferably 0.5-2% or 0%), 0-2% $Ta_2O_5$ (preferably 1.5-2% or 0-1.5%, more preferably 1-1.5% or 0), 0-1% $Bi_2O_3$ (preferably 0.5-1% or 0%), and a content of 0-1% of alkali metal oxide (preferably 0% or 0.8-1%), selected from at least one of $Na_2O$, $K_2O$, $Rb_2O$ and $Cs_2O$; wherein, by mass percentage, a content of $Na_2O$ constitutes 0-50% (preferably 0% or 20-50%) of the content of alkali metal oxide selected from $Na_2O$, $K_2O$, $Rb_2O$ and $Cs_2O$; and a total content of $La_2O_3$, $Nb_2O_5$, $Ta_2O_5$ and $Bi_2O_3$ is 1-10%.

In a second aspect, the present invention provides a method of preparing a glass material described in any of the embodiments of the first aspect of the present invention, comprising: mixing raw materials, melting, clarifying by stirring, molding by cooling, and precision annealing. The molding may be performed using either mechanical molding or manual casting.

In some embodiments of the present invention, a temperature of melting is 1450-1550 °C, a temperature of molding is 1100-1320 °C, and a temperature of annealing is 580-630 °C. The glass material prepared within this temperature range, according to the components and their proportions disclosed in the first aspect, has stable properties, including but not limited to good refractive performance, heat resistance, processability, and radiation resistance stability. Understandably, within this temperature range, higher temperatures can shorten the preparation process. If minimizing time costs is necessary, technicians may choose relatively higher temperatures within the disclosed range.

In some embodiments of the resent invention, the raw materials, as required, may be selected from the following materials: quartz sand, aluminum hydroxide (or aluminum oxide), calcium carbonate, barium nitrate (or barium carbonate), minium (or litharge or lead silicate), cerium oxide, lanthanum oxide, niobium pentoxide, tantalum pentoxide, bismuth oxide, sodium carbonate (or sodium nitrate), potassium carbonate (or potassium nitrate), rubidium carbonate, and cesium carbonate.

In a third aspect, the present invention provides an application of a glass material described in any of the embodiments of the first aspect in the preparation of optical components or instruments, including but not limited to optical glass and fiber optic panels.

The glass material described in the present invention not only exhibits excellent X-ray absorption and radiation stability but also has suitable coefficients of thermal expansion and softening temperatures. It demonstrates good process compatibility during processes of wire drawing and hot-pressing molding. For instance, the radiation-resistant fiber optic panels made from the glass material can maintain high short-wave transmittance and minimal increase in optical density under high radiation, with unchanged optical and physicochemical parameters. This fundamentally meets the requirements for radiation environment applications and addresses core material supply chain security issues for X-ray detectors.

In a fourth aspect, the present invention provides an optical component made from a glass material described in any one of the embodiments of the first aspect.

For instance, in a fifth aspect, the present invention provides an optical glass fiber, having a core comprising a glass material described in any one of the embodiments of the first aspect.

Similarly, in a sixth aspect, the present invention provides a fiber optic panel, having a core comprising a glass material described in any one of the embodiments of the first aspect. In some embodiments of the present invention, fiber optic panels are obtained by first encapsulating the glass material with cladding glass (such as silicate glass material), then drawing into single or multiple complex fibers, systematically arranging these fibers, followed by melting and pressing them into blank plate segments, and finally, the segments are processed through slicing, grinding, and polishing, resulting in customizable fiber optic panels with sizes up to a meter scale.

Compared with the existing technology, the present application has the following advantages:

The glass material provided by the present invention demonstrates superior comprehensive performance compared to similar domestic and international materials. It includes a high refractive index of ≥1.80; a lead equivalence of ≥0.3 mmPb; a transmittance reduction of ≤2% after 4700 Gy total X-ray irradiation; a glass transition temperature of ≥560 °C; a yield point temperature of ≥650 °C, indicative of good heat resistance; and a coefficient of thermal expansion of $(85\text{-}90)\times10^{-7}$/°C, ensuring excellent thermal processability. These properties make it suitable for creating large-sized devices.

BRIEF DESCRIPTION OF THE DRAWINGS

The accompanying drawings to the specification, which form part of the present application, are used to provide a further understanding of the present application, and the illustrative embodiments of the present application and the description thereof are used to explain the present application and are not unduly limiting the present application. Hereinafter, embodiments of the present application are described in detail with reference to the accompanying drawings, wherein.

DESCRIPTION OF THE PREFERRED EMBODIMENTS

Figure 1:
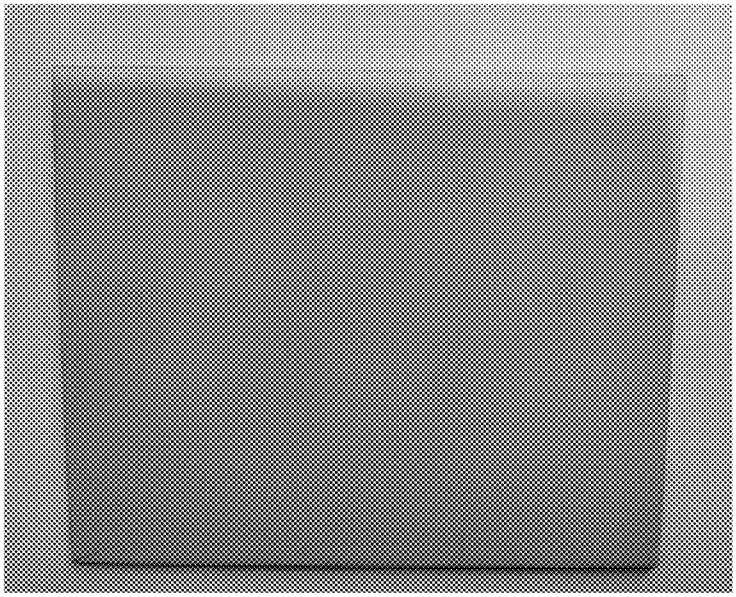
FIG. 1 shows a photograph of a large-sized (140×80×2 $mm^3$) radiation-resistant fiber optic panel made using the glass material of the present invention.

The present application is further described below with reference to specific embodiments. It should be understood that these embodiments are intended to illustrate the present application only and not to limit the scope of the present application. Experimental methods for which specific conditions are not indicated in the following embodiments generally follow conventional conditions or follow the conditions recommended by the manufacturer.

Unless otherwise defined, all professional and scientific terms used in the text have the same meaning as those familiar to those skilled in the art. Reagents or raw materials used in the present application are available through conventional means. Unless otherwise specified, reagents or raw materials used in the present application are used in a conventional manner in the field or in accordance with product specifications. In addition, any methods, and materials similar or equivalent to those described herein can be used in the methods of the present disclosure. The preferred embodiments described herein are exemplary only.

The present invention provides a high refractive index, radiation-resistant glass material. By mass percentage, the glass material comprises, or is composed of, the following components: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and a content of 0-1% of alkali metal oxide, wherein the alkali metal oxide is selected from at least one of $Na_2O$, $K_2O$, $Rb_2O$ and $Cs_2O$ when the content of alkali metal oxide is not 0. The glass material according to the present invention possesses outstanding properties, selected from excellent X-ray absorption and radiation resistance stability, appropriate coefficient of thermal expansion and softening temperature, good processability and adaptability in manufacturing. The glass material according to the present invention can be used as core glass material for optical glass fibers and fiber optic panels. The fiber optic panels made from the glass material also exhibit superior radiation resistance, fundamentally meeting the requirements for applications in radiative environments. This resolves the core material supply challenges and industrial chain security issues for X-ray detectors.

Specifically, in the present invention, the glass material, when composed of the aforementioned components, exhibits exceptional properties in certain embodiments. For example, in some embodiments, a refractive index of the glass material is ≥1.8; in some embodiments, a glass transition temperature of the glass material is ≥560 °C; in some embodiments, a yield point temperature of the glass material is ≥650 °C; in some embodiments, a thermal expansion coefficient of the glass material is $(85\text{-}90)\times10^{-7}$/°C. between 30 °C and 300 °C; and in some embodiments, a transmittance of the glass material is over 80% at 560 nm, which remains above 78.5% even after irradiation with a 4700 Gy dose of X-rays, with a transmittance reduction of ≤2%. Additionally, in some embodiments of the present invention, the glass material combines these superior properties, with a refractive index of ≥1.8, glass transition temperature of ≥560 °C, a coefficient of thermal expansion of $(85\text{-}90)\times10^{-7}$/°C, and a reduction in transmittance of ≤2%, or even ≤1.5%, ≤1.3%, or ≤1.2% after 4700 Gy dose of X-ray irradiation, making it particularly suitable for the preparation of optical components or instruments.

Furthermore, the present invention provides a method of preparing a high refractive index, radiation-resistant glass material, comprising mixing raw materials, melting, clarifying by stirring, molding by cooling, and precision annealing. In some embodiments, the invention provides an optimal preparation method, including mixing raw materials in proportions, melting, and clarifying at high temperatures of 1450 °C to 1550 °C, casting at 1100 °C to 1320 °C. (both mechanical and manual casting are viable), followed by annealing at 580 °C to 630 °C. This method ensures process stability, and the glass material prepared under this process exhibits stable characteristics. These characteristics do not fluctuate significantly with temperature variations within this range and include, but are not limited to, excellent refractive performance, heat resistance, processability, and radiation resistance stability. Understandably, within this temperature range, higher temperatures can shorten the preparation process. If minimizing time costs is necessary, technicians may choose relatively higher temperatures within the disclosed range.

To further illustrate the present invention in greater detail, specific examples are provided below.

Example 1

This example of radiation-resistant, high-refractive-index glass material was composed of the following components by mass percentage: 30% $SiO_2$, 5% $Al_2O_3$, 3% CaO, 9.2% BaO, 45% PbO, 5% $CeO_2$, 1% $Nb_2O_5$, 1% $Bi_2O_3$, and 0.8% $Cs_2O$.

In this example, the radiation-resistant, high-refractive-index glass material was made using quartz sand, aluminum oxide, calcium carbonate, barium carbonate, lead silicate, cerium oxide, niobium pentoxide, bismuth oxide, and cesium carbonate as raw materials. These raw materials were mixed in proportion and then melted at 1500 °C. The mixture underwent auxiliary stirring for clarification, followed by mechanical molding at 1236 °C, and was finally annealed at 605 °C to obtain the final product.

The refractive index of the glass sample was tested using a Metricon Model 2010/M Prism Coupler. When a beam of light perpendicular to the plane of incidence entered a V prism, if the refractive index of the sample matched that of the V prism, the light passed through without deviation. If the refractive index of the sample differed from the prism, refraction occurred. By measuring the angle between the refracted and incident light, the refractive index of the sample was calculated using the law of refraction. (GB/T 7962.1-2010)

The transmittance of glass samples was determined using a Shimadzu UV-3600Plus UV-Visible spectrophotometer. The test wavelength range was 300 nm to 1500 nm, and the tested glass samples were optically polished with a thickness of 5 mm. (GB/T 7962.12-2010)

The coefficient of thermal expansion of glass samples was tested using a Netzsch DIL 402 dilatometer. The samples were polished into cylindrical rods of Φ(PHi) 6×50 mm with parallel ends. The heating rate was set at 5 °C/min, and the data collection interval was 20 ms. The temperature vs. linear expansion curve was plotted to determine the glass transition and softening temperatures (GB/T 7962.16-2010)

The radiation-resistant, high-refractive-index glass material produced in this example had a refractive index of 1.81, a transmittance of 80.3% after 4700 Gy X-ray irradiation (a decrease of 1.58%), a glass transition temperature of 570 °C, a yield point temperature of 677 °C, and a coefficient of thermal expansion of $86.8\times10^{-7}$/°C.

Example 2

This example of radiation-resistant, high-refractive-index glass material was composed of the following components by mass percentage: 20% $SiO_2$, 10% $Al_2O_3$, 4% CaO, 15% BaO, 48% PbO, 1% $CeO_2$, 0.5% $La_2O_3$, 0.5% $Bi_2O_3$, and 1% $K_2O$.

In this example, the radiation-resistant, high-refractive-index glass material was made using quartz sand, aluminum hydroxide, calcium carbonate, barium carbonate, minium (read lead oxide), cerium oxide, lanthanum oxide, bismuth oxide, and potassium nitrate as raw materials. These raw materials were mixed in proportion and then melted at 1485 °C. The mixture underwent auxiliary stirring for clarification, followed by mechanical molding at 1202 °C, and was finally annealed at 599 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.83, a transmittance of 78.62% after 4700 Gy X-ray irradiation (a decrease of 1.4%), a glass transition temperature of 568 °C, a yield point temperature of 658 °C, and a coefficient of thermal expansion of $88.1\times10^{-7}$/°C.

Example 3

This example of radiation-resistant, high-refractive-index glass material was composed of the following components by mass percentage: 27.5% $SiO_2$, 2% $Al_2O_3$, 5% CaO, 8% BaO, 50% PbO, 3% $CeO_2$, 2% $La_2O_3$, 0.5% $Nb_2O_5$, 1% $Ta_2O_5$, 0.5% $Rb_2O$ and 0.5% $Cs_2O$.

In this example, the radiation-resistant, high-refractive-index glass material was made using quartz sand, aluminum hydroxide, calcium carbonate, barium nitrate, lead silicate, cerium oxide, lanthanum oxide, niobium pentoxide, tantalum pentoxide, rubidium carbonate, and cesium carbonate as raw materials. These raw materials were mixed in proportion and then melted at 1520 °C. The mixture underwent auxiliary stirring for clarification, followed by mechanical molding at 1266 °C, and was finally annealed at 611 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.83, a transmittance of 80.83% after 4700 Gy X-ray irradiation (a decrease of 1.18%), a glass transition temperature of 574 °C, a yield point temperature of 680 °C, and a coefficient of thermal expansion of $86.2\times10^{-7}$/°C.

Example 4

This example of radiation-resistant, high-refractive-index glass material was composed of the following components by mass percentage: 35% $SiO_2$, 18.1% BaO, 40% PbO, 1.7% $CeO_2$, 2% $La_2O_3$, 1% $Nb_2O_5$, 1% $Ta_2O_5$, 0.3% $Bi_2O_3$, 0.4% $Na_2O$, and 0.5% $K_2O$.

In this example, the radiation-resistant, high-refractive-index glass material was made using quartz sand, barium nitrate, litharge (yellow lead oxide), cerium oxide, lanthanum oxide, niobium pentoxide, tantalum pentoxide, bismuth oxide, sodium carbonate, and potassium carbonate as raw materials. These raw materials were mixed in proportion and then melted at 1465 °C. The mixture underwent auxiliary stirring for clarification, followed by manually casting at 1180 °C, and was finally annealed at 592 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.80, a transmittance of 80.44% after 4700 Gy X-ray irradiation (a decrease of 1.57%), a glass transition temperature of 565 °C, a yield point temperature of 650 °C, and a coefficient of thermal expansion of $89.4\times10^{-7}$/°C.

Example 5

This example of radiation-resistant, high-refractive-index glass material was composed of the following components by mass percentage: 32% $SiO_2$, 8% $Al_2O_3$, 2% CaO, 7% BaO, 43% PbO, 1% $CeO_2$, 1.7% $La_2O_3$, 1.5% $Nb_2O_5$, 2% $Ta_2O_5$, 0.8% $Bi_2O_3$, 0.5% $Na_2O$, and 0.5% $Cs_2O$.

In this example, the radiation-resistant, high-refractive-index glass material was made using quartz sand, aluminum oxide, calcium carbonate, barium carbonate, lead silicate, cerium oxide, lanthanum oxide, niobium pentoxide, tantalum pentoxide, bismuth oxide, sodium nitrate, and cesium carbonate as raw materials. These raw materials were mixed in proportion and then melted at 1533 °C. The mixture underwent auxiliary stirring for clarification, followed by mechanical molding at 1291 °C, and was finally annealed at 618 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.80, a transmittance of 79.45% after 4700 Gy X-ray irradiation (a decrease of 1.43%), a glass transition temperature of 575 °C, a yield point temperature of 685 °C, and a coefficient of thermal expansion of $85.8\times10^{-7}$/°C.

Example 6

This example of radiation-resistant, high-refractive-index glass material was composed of the following components by mass percentage: 40% $SiO_2$, 7% $Al_2O_3$, 1% 的 CaO 5% BaO, 44% PbO, 2% $CeO_2$, 0.5% $La_2O_3$ and 0.5% $Bi_2O_3$.

In this example, the radiation-resistant, high-refractive-index glass material was made using quartz sand, aluminum oxide, calcium carbonate, barium carbonate, litharge (yellow lead oxide), cerium oxide, lanthanum oxide, and bismuth oxide as raw materials. These raw materials were mixed in proportion and then melted at 1544 °C. The mixture underwent auxiliary stirring for clarification, followed by mechanical molding at 1301 °C, and was finally annealed at 624 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.82, a transmittance of 79.99% after 4700 Gy X-ray irradiation (a decrease of 1.23%), a glass transition temperature of 577 °C, a yield point temperature of 692 °C, and a coefficient of thermal expansion of $85.5\times10^{-7}$/°C.

Example 7

This example of radiation-resistant, high-refractive-index glass material was composed of the following components by mass percentage: 25% $SiO_2$, 6% $Al_2O_3$, 20% BaO, 40% PbO, 2% $CeO_2$, 3% $La_2O_3$, 2% $Nb_2O_5$, 1% $Bi_2O_3$, 0.5% $Na_2O$, and 0.5% $Rb_2O$.

In this example, the radiation-resistant, high-refractive-index glass material was made using quartz sand, aluminum hydroxide, barium carbonate, lead silicate, cerium oxide, lanthanum oxide, niobium pentoxide, bismuth oxide, sodium carbonate and rubidium carbonate as raw materials. These raw materials were mixed in proportion and then melted at 1450 °C. The mixture underwent auxiliary stirring for clarification, followed by manually casting at 1100 °C, and was finally annealed at 580 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.82, a transmittance of 79.04% after 4700 Gy X-ray irradiation (a decrease of 1.52%), a glass transition temperature of 560 °C, a yield point temperature of 652 °C, and a coefficient of thermal expansion of $90.0\times10^{-7}$/°C.

Example 8

This example of radiation-resistant, high-refractive-index glass material was composed of the following components by mass percentage: 30.5% $SiO_2$, 2% $Al_2O_3$, 4% CaO, 6% BaO, 45% PbO, 2% $CeO_2$, 5% $La_2O_3$, 2% $Nb_2O_5$, 1.5% $Ta_2O_5$, 1% $Bi_2O_3$, 0.2% $Na_2O$, 0.5% $K_2O$, and 0.3% $Rb_2O$.

In this example, the radiation-resistant, high-refractive-index glass material was made using quartz sand, aluminum oxide, calcium carbonate, barium carbonate, lead silicate, cerium oxide, lanthanum oxide, niobium pentoxide, tantalum pentoxide, bismuth oxide, sodium nitrate, and cesium carbonate as raw materials. These raw materials were mixed in proportion and then melted at 1550 °C. The mixture underwent auxiliary stirring for clarification, followed by mechanical molding at 1320 °C, and was finally annealed at 630 °C to obtain the final product.

The glass material in this example was tested using the same methods as in Example 1, allowing for the determination of the refractive index, transmittance, coefficient of thermal expansion, glass transition temperature, and yield point temperature. The radiation-resistant, high-refractive-index glass material produced in this example had a refractive index of 1.81, a transmittance of 80.09% after 4700 Gy X-ray irradiation (a decrease of 1.62%), a glass transition temperature of 580 °C, a yield point temperature of 699 °C, and a coefficient of thermal expansion of $85.0\times10^{-7}$/°C.

Example 9

The radiation-resistant, high-refractive-index glass materials produced in Examples 1 to 8 were used as core glass materials for the fabrication of fiber optic panels. The fiber optic panels were obtained by encapsulating the glass material (serving as core glass material) from Examples 1 to 8 with cladding glass material (silicate glass), then drawing into single or multiple complex fibers, systematically arranging these fibers, followed by melting and pressing them into blank plate segments, and finally, the segments are processed through slicing, grinding, and polishing, resulting in customizable fiber optic panels with sizes up to a meter scale.

FIG. 1 shows a photograph of a large-sized (140×80×2 $mm^3$) radiation-resistant fiber optic panel made using the glass material of the present invention.

The transmittance of the fiber optic panels was tested using the same method as in Example 1. The panels produced in Examples 1 to 8 of the present invention all exhibited good radiation resistance, with a decrease in transmittance at 560 nm of ≤0.89% before and after irradiation.

Comparative Example 1

The glass material for this comparative example is composed of the following components by mass percentage: 45% $SiO_2$, 2% $Al_2O_3$, 4% CaO, 8% BaO, 32.5% PbO, 1% $CeO_2$, 2% $La_2O_3$, 0.5% $Nb_2O_5$, 1% $Ta_2O_5$, 2% $Bi_2O_3$, 1% $Na_2O$, 0.5% $Rb_2O$, and 0.5% $Cs_2O$.

In this comparative example, the glass material was prepared using quartz sand, aluminum oxide, calcium carbonate, barium carbonate, lead silicate, cerium oxide, lanthanum oxide, niobium pentoxide, tantalum pentoxide, bismuth oxide, sodium carbonate, rubidium carbonate, and cesium carbonate as raw materials, following the method outlined in Example 1.

The glass material in this example was tested using the same methods as in Example 1, allowing for the determination of the refractive index, transmittance, coefficient of thermal expansion, glass transition temperature, and yield point temperature. In this comparative example, the glass material had a refractive index of 1.60, a transmittance of 73.65% after 4700 Gy X-ray irradiation (a decrease of 4.7%), a glass transition temperature of 568 °C, a yield point temperature of 670 °C, and a coefficient of thermal expansion of $87.0\times10^{-7}$/°C.

Comparative Example 2

The glass material for this comparative example is composed of the following components by mass percentage: 27.5% $SiO_2$, 2% $Al_2O_3$, 6% CaO, 58% PbO, 2% $La_2O_3$, 0.5% $Nb_2O_5$, 1% $Ta_2O_5$, 2% $Bi_2O_3$, 0.5% $Rb_2O$, and 0.5% $Cs_2O$.

In this comparative example, the glass material was prepared using quartz sand, aluminum oxide, calcium carbonate, litharge (yellow lead oxide), lanthanum oxide, niobium pentoxide, tantalum pentoxide, bismuth oxide, rubidium carbonate, and cesium carbonate as raw materials, following the method outlined in Example 1.

The glass material in this example was tested using the same methods as in Example 1, allowing for the determination of the refractive index, transmittance, coefficient of thermal expansion, glass transition temperature, and yield point temperature. In this comparative example, the glass material had a refractive index of 1.71, a transmittance of 72.01% after 4700 Gy X-ray irradiation (a decrease of 4.31%), a glass transition temperature of 601 °C, a yield point temperature of 719 °C, and a coefficient of thermal expansion of $79.9\times10^{-7}$/°C.

Comparative Example 3

The glass material for this comparative example is composed of the following components by mass percentage: 16% $SiO_2$, 2% $Al_2O_3$, 8% CaO, 8% BaO, 50% PbO, 2% $La_2O_3$, 0.5% $Nb_2O_5$, 1% $Ta_2O_5$, 2% $Na_2O$, 9.5% $K_2O$, 0.5% $Rb_2O$, and 0.5% $Cs_2O$.

In this comparative example, the glass material was prepared using quartz sand, aluminum oxide, calcium carbonate, barium nitrate, minium (read lead oxide), lanthanum oxide, niobium pentoxide, tantalum pentoxide, bismuth oxide, sodium nitrate, potassium carbonate, rubidium carbonate, and cesium carbonate as raw materials, following the method outlined in Example 1.

The glass material in this example was tested using the same methods as in Example 1, allowing for the determination of the refractive index, transmittance, coefficient of thermal expansion, glass transition temperature, and yield point temperature. In this comparative example, the glass material had a refractive index of 1.72, a transmittance of 75.28% after 4700 Gy X-ray irradiation (a decrease of 2.73%), a glass transition temperature of 548 °C, a yield point temperature of 629 °C, and a coefficient of thermal expansion of $91.1\times10^{-7}$/°C.

Comparative Example 4

The glass material for this comparative example is composed of the following components by mass percentage: 25% $SiO_2$, 15% $Al_2O_3$, 6% CaO, 5% BaO, 35% PbO, 8% $CeO_2$, 2% $Ta_2O_5$, 1% $Bi_2O_3$, 1% $Na_2O$, 1% $K_2O$, and 1% $Rb_2O$.

In this comparative example, the glass material was prepared using quartz sand, aluminum oxide, calcium carbonate, barium nitrate, litharge (yellow lead oxide), cerium oxide, tantalum pentoxide, bismuth oxide, sodium nitrate, potassium carbonate, and rubidium carbonate as raw materials, following the method outlined in Example 1.

The glass material in this example was tested using the same methods as in Example 1, allowing for the determination of the refractive index, transmittance, coefficient of thermal expansion, glass transition temperature, and yield point temperature. In this comparative example, the glass material had a refractive index of 1.61, a transmittance of 63.31% after 4700 Gy X-ray irradiation (a decrease of 5.71%), a glass transition temperature of 563 °C, a yield point temperature of 660 °C, and a coefficient of thermal expansion of $87.8\times10^{-7}$/°C.

Comparative Example 5

The glass material for this comparative example is composed of the following components by mass percentage: 28% $SiO_2$, 10% $Al_2O_3$, 7% CaO, 10% BaO, 30% PbO, 3% $CeO_2$, 1% $Nb_2O_5$, 3% $Ta_2O_5$, 2% $Bi_2O_3$, 5% $Na_2O$, and 1% $K_2O$.

In this comparative example, the glass material was prepared using quartz sand, aluminum oxide, calcium carbonate, barium nitrate, minium (read lead oxide), cerium oxide, niobium pentoxide, tantalum pentoxide, bismuth oxide, sodium nitrate, and potassium carbonate as raw materials, following the method outlined in Example 1.

The glass material in this example was tested using the same methods as in Example 1, allowing for the determination of the refractive index, transmittance, coefficient of thermal expansion, glass transition temperature, and yield point temperature. In this comparative example, the glass material had a refractive index of 1.6, a transmittance of 67.5300 after 4700 Gy X-ray irradiation (a decrease of 4.36%), a glass transition temperature of 559 °C, a yield point temperature of 646 °C, and a coefficient of thermal expansion of $90.2\times10^{-7}$/°C.

In the present invention, the composition and properties of glass samples from Examples 1 to 8, and Comparative Examples 1 to 5, were respectively detailed in Table 1 and Table 2.

TABLE 1 composition of glass samples from examples 1 to 8, and comparative examples 1 to 5.

| | Example | | | | | | | | Comparative Example | | | | |
|---|---|---|---|---|---|---|---|---|---|---|---|---|---|
| wt % | 1 | 2 | 3 | 4 | 5 | 6 | 7 | 8 | 1 | 2 | 3 | 4 | 5 |
| $SiO_2$ | 30.0 | 20.0 | 27.5 | 35.0 | 32.0 | 40.0 | 25.0 | 30.5 | 45.0 | 27.5 | 16.0 | 25.0 | 28.0 |
| $Al_2O_3$ | 5.0 | 10.0 | 2.0 | 0 | 8.0 | 7.0 | 6.0 | 2.0 | 2.0 | 2.0 | 2.0 | 15.0 | 10.0 |
| CaO | 3.0 | 4.0 | 5.0 | 0 | 2.0 | 1.0 | 0 | 4.0 | 4.0 | 6.0 | 8.0 | 6.0 | 7.0 |
| BaO | 9.2 | 15.0 | 8.0 | 18.1 | 7.0 | 5.0 | 20.0 | 6.0 | 8.0 | 0 | 8.0 | 5.0 | 10.0 |
| PbO | 45.0 | 48.0 | 50.0 | 40.0 | 43.0 | 44.0 | 40.0 | 45.0 | 32.5 | 58.0 | 50.0 | 35.0 | 30.0 |
| $CeO_2$ | 5.0 | 1.0 | 3.0 | 1.7 | 1.0 | 2.0 | 2.0 | 2.0 | 1.0 | 0 | 0 | 8.0 | 3.0 |
| $La_2O_3$ | 0 | 0.5 | 2.0 | 2.0 | 1.7 | 0.5 | 3.0 | 5.0 | 2.0 | 2.0 | 2.0 | 0 | 0 |
| $Nb_2O_5$ | 1.0 | 0 | 0.5 | 1.0 | 1.5 | 0 | 2.0 | 2.0 | 0.5 | 0.5 | 0.5 | 0 | 1.0 |
| $Ta_2O_5$ | 0 | 0 | 1.0 | 1.0 | 2.0 | 0 | 0 | 1.5 | 1.0 | 1.0 | 1.0 | 2.0 | 3.0 |
| $Bi_2O_3$ | 1.0 | 0.5 | 0 | 0.3 | 0.8 | 0.5 | 1.0 | 1.0 | 2.0 | 2.0 | 0 | 1.0 | 2.0 |
| $Na_2O$ | 0 | 0 | 0 | 0.4 | 0.5 | 0 | 0.5 | 0.2 | 1.0 | 0 | 2.0 | 1.0 | 5.0 |
| $K_2O$ | 0 | 1.0 | 0 | 0.5 | 0 | 0 | 0 | 0.5 | 0 | 0 | 9.5 | 1.0 | 1.0 |
| $Rb_2O$ | 0 | 0 | 0.5 | 0 | 0 | 0 | 0.5 | 0.3 | 0.5 | 0.5 | 0.5 | 1.0 | 0 |
| $Cs_2O$ | 0.8 | 0 | 0.5 | 0 | 0.5 | 0 | 0 | 0 | 0.5 | 0.5 | 0.5 | 0 | 0 |
| Sum | 100 | 100 | 100 | 100 | 100 | 100 | 100 | 100 | 100 | 100 | 100 | 100 | 100 |

TABLE 2 test results of the properties of glass samples from examples 1 to 8, and comparative examples 1 to 5.

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| | | Example/Comparative Example | | | | | | | | | | | | |
| | | Example | | | | | | | | Comparative Example | | | | |
| | | 1 | 2 | 3 | 4 | 5 | 6 | 7 | 8 | 1 | 2 | 3 | 4 | 5 |
| Refractive Index | | 1.81 | 1.83 | 1.83 | 1.80 | 1.80 | 1.82 | 1.82 | 1.81 | 1.60 | 1.71 | 1.72 | 1.61 | 1.60 |
| Transmittance at 560 nm (%) | Before X-ray Irradiation | 81.88 | 80.02 | 82.01 | 82.01 | 80.88 | 81.22 | 80.56 | 81.71 | 78.35 | 76.32 | 78.01 | 69.02 | 71.89 |
| | After 4700Gy X-Ray Irradiation | 80.3 | 78.62 | 80.83 | 80.44 | 79.45 | 79.99 | 79.04 | 80.09 | 73.65 | 72.01 | 75.28 | 63.31 | 67.53 |
| | Difference | 1.58 | 1.4 | 1.18 | 1.57 | 1.43 | 1.23 | 1.52 | 1.62 | 4.7 | 4.31 | 2.73 | 5.71 | 4.36 |
| Glass Transition Temperature (Tg) (° C.) | | 570 | 568 | 574 | 565 | 575 | 577 | 560 | 580 | 568 | 601 | 548 | 563 | 559 |
| Yield point temperature (° C.) | | 677 | 658 | 680 | 650 | 685 | 692 | 652 | 699 | 670 | 719 | 629 | 660 | 646 |
| Coefficient of Thermal Expansion (CTE) ($\times 10^{-7}$/° C.) | | 86.8 | 88.1 | 86.2 | 89.4 | 85.8 | 85.5 | 90.0 | 85.0 | 87.0 | 79.9 | 91.1 | 87.8 | 90.2 |

Figure 2:
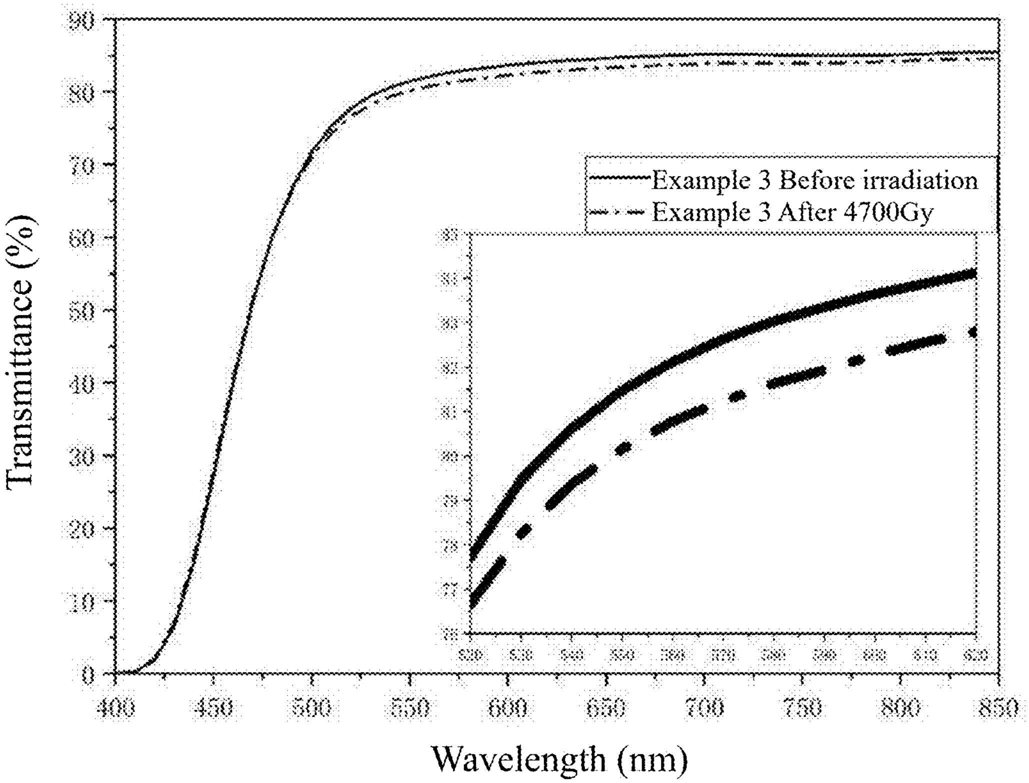
FIG. 2 shows the transmittance comparison (at 560 nm) before and after X-ray irradiation (4700 Gy dose) for the glass material from Example 3 of the present invention.
Figure 3:
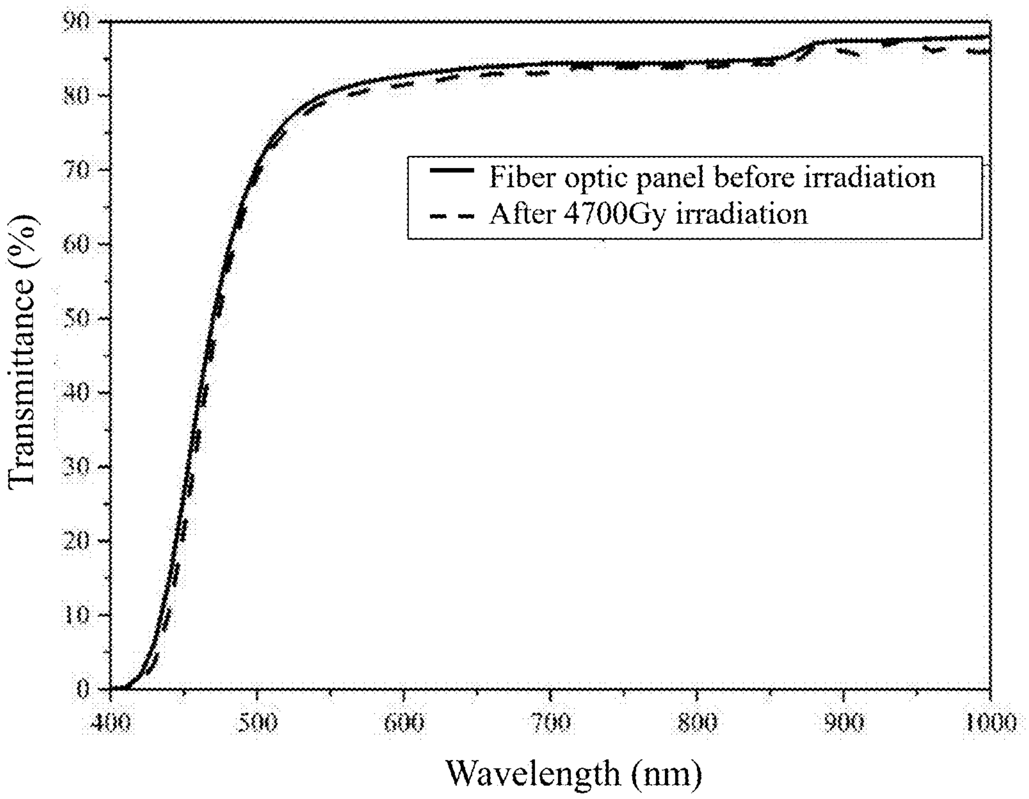
FIG. 3 shows the transmittance comparison (at 560 nm) before and after X-ray irradiation (4700 Gy dose) for the glass material from Example 4 of the present invention.

From Table 2, it was evident that the core glass materials for the radiation-resistant fiber optic panels prepared in each example have a refractive index of ≥1.80, a glass transition temperature of ≥560 °C, and a yield point temperature of ≥650 °C. These properties indicated good heat resistance. The coefficient of thermal expansion of these materials was $(85\text{-}90)\times10^{-7}$/°C, indicating good thermal processing properties, which was beneficial for the fabrication of large-sized devices. Furthermore, the transmittance reduction before and after 4700 Gy X-ray irradiation was ≤2%. FIG. 2 showed a comparison of the transmittance of glass material prepared in Example 3 of the present invention, before and after X-ray irradiation at a dose of 4700 Gy. The glass material prepared in Example 3 of the present invention exhibited very little difference in transmittance before and after irradiation, and its performance was superior to that of the American company Incom.

Additionally, fiber optic panels made from the glass materials prepared in Examples 1 to 8 were also tested. These panels demonstrated good radiation resistance as well, with a decrease in transmittance at 560 nm of ≤0.89% before and after irradiation.

The aforementioned descriptions are only preferred embodiments of the present application and are not intended to limit the scope of the present application. Although the aforementioned embodiments have been described in detail, those skilled in the art can still modify the technical solutions described in the embodiments or replace some technical features with equivalent alternatives. Any modifications, equivalent replacements, improvements, and the like made within the spirit and principles of the present application should be included within the scope of the present application's protection.

What is claimed is:

1. A glass material consisting of the following components, in percentages by mass: 20-36% $SiO_2$, 2-10% $Al_2O_3$, 1-5% CaO, 5-20% BaO, 40-50% PbO, 1-5% $CeO_2$, 0-5% $La_2O_3$, 0-2% 0.5-2% $Nb_2O_5$, 0-2% $Ta_2O_5$, 0-1% $Bi_2O_3$, and one or more oxides selected from the group consisting of $Na_2O$, $K_2O$, $Rb_2O$, and $Cs_2O$, wherein a total content of the one or more oxides is 0.8-1% by mass; wherein; a total content of $La_2O_3$, $Nb_2O_5$, $Ta_2O_5$, and $Bi_2O_3$ is 1-10% by mass; and wherein the content of $Na_2O$ is 0% by mass or is 20-50% of the total content of $Na_2O$, $K_2O$, $Rb_2O$, and $Cs_2O$.

2. The glass material according to claim 1, wherein the content of $Bi_2O_3$ is 0.3-1% by mass.

3. The glass material according to claim 1, wherein the content of $Bi_2O_3$ is 0% by mass.

4. The glass material according to claim 1, wherein the content of PbO is 43-50% by mass.

5. The glass material according to claim 1, wherein the content of BaO is 5-15% by mass.

6. The glass material according to claim 1, wherein the content of $CeO_2$ is 1.7-5% by mass.

7. The glass material according to claim 1, wherein the content of $Al_2O_3$ is 2-8% by mass.

8. The glass material according to claim 1, wherein the content of CaO is 4-5% by mass.

9. The glass material according to claim 1, wherein the content of $La_2O_3$ is 0-1.7% by mass.

10. The glass material according to claim 1, wherein the content of $Ta_2O_5$ is 1-2% by mass.

11. The glass material according to claim 10, wherein the content of $Bi_2O_3$ is 0.3-1% by mass.

12. The glass material according to claim 1, wherein the content of $La_2O_3$ is 0.5-5% by mass.

13. The glass material according to claim 12, wherein the content of $Bi_2O_3$ is 0.3-1% by mass.

14. The glass material according to claim 12, wherein the content of $Ta_2O_5$ is 1-2% by mass.

15. The glass material according to claim 14, wherein the content of $Ta_2O_5$ is 1.5-2% by mass and the content of $Bi_2O_3$ is 0.5-1% by mass.

16. The glass material according to claim 1, wherein the glass material has a refractive index of at least 1.8, a glass transition temperature of at least 560 °C, a yield point temperature of at least 650 °C, a coefficient of thermal expansion at 30-300 °C of $(85\text{-}90)\times10^{-7}$/°C, and a transmittance reduction of no more than 2% after irradiation with an X-ray dose of 4700Gy.

17. A method of preparing a glass material as claimed in claim 1, the method comprising: mixing raw materials, melting, clarifying by stirring, molding by cooling, and precision annealing.

18. The method according to claim 17, wherein a melting temperature is 1450-1550 °C, a molding temperature is 1100-1320 °C, and a precision annealing temperature is 580-630 °C.

19. An optical glass fiber having a core made from a glass material according to claim 1.

20. A fiber optic panel having a core made from a glass material according to claim 1.

21. A glass material consisting of the following components in percentages by mass: 20-36% $SiO_2$, 2-10% $Al_2O_3$, 1-5% CaO, 5-20% BaO, 40-50% PbO, 1-5% $CeO_2$, 0-5% $La_2O_3$, 0-2% $Nb_2O_5$, 1-2% $Ta_2O_5$, 0-1% $Bi_2O_3$, and one or more oxides selected from the group consisting of $Na_2O$, $K_2O$, $Rb_2O$, and $Cs_2O$, wherein a total content of the one or more oxides is 0.8-1% by mass; wherein a total content of $La_2O_3$, $Nb_2O_5$, $Ta_2O_5$, and $Bi_2O_3$ is 1-10% by mass; and wherein the content of $Na_2O$ is 0% by mass or is 20-50% of the total content of $Na_2O$, $K_2O$, $Rb_2O$, and $Cs_2O$.

22. The glass material according to claim 21, wherein the content of $Bi_2O_3$ is 0.3-1% by mass.

23. The glass material according to claim 21, wherein the content of $Bi_2O_3$ is 0% by mass.

24. The glass material according to claim 21, wherein the content of $Nb_2O_5$ is 0% by mass.

25. The glass material according to claim 21, wherein the content of PbO is 43-50% by mass.

26. The glass material according to claim 21, wherein the content of BaO is 5-15% by mass.

27. The glass material according to claim 21, wherein the content of $CeO_2$ is 1.7-5% by mass.

28. The glass material according to claim 21, wherein the content of $Al_2O_3$ is 2-8% by mass.

29. The glass material according to claim 21, wherein the content of $La_2O_3$ is 0-1.7% by mass.

30. The glass material according to claim 1, wherein the content of $Ta_2O_5$ is 0-1.5% by mass.

31. The glass material according to claim 30, wherein the content of $Ta_2O_5$ is 0% or 1-1.5% by mass.

32. The glass material according to claim 21, wherein the content of $La_2O_3$ is 0.5-5% by mass.

33. The glass material according to claim 32, wherein the content of $Bi_2O_3$ is 0.3-1% by mass.

34. The glass material according to claim 21, wherein the glass material has a refractive index of at least 1.8, a glass transition temperature of at least 560 °C, a yield point temperature of at least 650 °C, a coefficient of thermal expansion at 30-300 °C of $(85\text{-}90)\times10^{-7}$/°C, and a transmittance reduction of no more than 2% after irradiation with an X-ray dose of 4700 Gy.

35. A method of preparing a glass material as claimed in claim 21, the method comprising mixing raw materials, melting, clarifying by stirring, molding by cooling, and precision annealing.

36. An optical glass fiber having a core made from a glass material according to claim 21.

37. A fiber optic panel having a core made from a glass material according to claim 21.

* * * * *